US009798580B2

(12) United States Patent
Chu

(10) Patent No.: US 9,798,580 B2
(45) Date of Patent: Oct. 24, 2017

(54) METHOD AND APPARATUS FOR MANAGING BACKGROUND APPLICATION

(71) Applicant: ALIBABA GROUP HOLDING LIMITED, George Town, Grand Cayman (KY)

(72) Inventor: Tianying Chu, Shanghai (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 47 days.

(21) Appl. No.: 14/832,672

(22) Filed: Aug. 21, 2015

(65) Prior Publication Data

US 2016/0062793 A1    Mar. 3, 2016

(30) Foreign Application Priority Data

Aug. 26, 2014   (CN) .......................... 2014 1 0426114

(51) Int. Cl.
G06F 9/455     (2006.01)
G06F 9/48      (2006.01)

(52) U.S. Cl.
CPC ................................. *G06F 9/485* (2013.01)

(58) Field of Classification Search
None
See application file for complete search history.

(56) References Cited

U.S. PATENT DOCUMENTS

| | | | |
|---|---|---|---|
| 7,996,045 B1 * | 8/2011 | Bauer | G06F 3/0488 455/466 |
| 8,140,115 B1 | 3/2012 | Kahn et al. | |
| 8,886,976 B2 | 11/2014 | Jiang et al. | |
| 8,897,762 B2 | 11/2014 | Cherian et al. | |
| 9,060,196 B2 | 6/2015 | Torr et al. | |
| 9,588,642 B2 * | 3/2017 | Terazono | G06F 3/04817 |
| 9,588,805 B2 * | 3/2017 | Yuan | G06F 9/485 |
| 2005/0044508 A1 * | 2/2005 | Stockton | G06F 9/4443 715/811 |
| 2007/0006093 A1 | 1/2007 | Day et al. | |
| 2009/0076963 A1 | 3/2009 | Worthington | |

(Continued)

FOREIGN PATENT DOCUMENTS

WO    WO 03/061254 A1    7/2003
WO    WO 2009/088652 A1  7/2009

(Continued)

OTHER PUBLICATIONS

PCT International Search Report and Written Opinion dated Nov. 13, 2015, issued in corresponding International Application No. PCT/US2015/046399 (9 pages).

(Continued)

*Primary Examiner* — Hiren Patel
(74) *Attorney, Agent, or Firm* — Finnegan, Henderson, Farabow, Garrett & Dunner, LLP

(57) ABSTRACT

A method for managing a background application is provided. The method includes determining whether an operating feature of the background application satisfies a preset condition, and when it is determined that the operating feature of the background application satisfies the preset condition, displaying an operating interface in a foreground interface of a mobile device for a user to close the background application.

14 Claims, 7 Drawing Sheets

(56) References Cited

U.S. PATENT DOCUMENTS

| | | | |
|---|---|---|---|
| 2009/0158212 A1* | 6/2009 | Dykstra-Erickson | G06F 3/0482 715/811 |
| 2011/0296416 A1* | 12/2011 | Kim | G06F 11/328 718/100 |
| 2012/0192113 A1* | 7/2012 | Higuchi | G06F 1/162 715/835 |
| 2012/0209413 A1 | 8/2012 | Xu et al. | |
| 2012/0210321 A1 | 8/2012 | Silva et al. | |
| 2012/0260118 A1 | 10/2012 | Jiang et al. | |
| 2013/0047198 A1* | 2/2013 | Srour | G06F 9/485 726/1 |
| 2013/0339942 A1* | 12/2013 | Brunsman | G06F 8/61 717/173 |
| 2014/0007106 A1* | 1/2014 | Weksler | G06F 9/485 718/100 |
| 2014/0031026 A1* | 1/2014 | Long | H04W 4/001 455/418 |
| 2014/0317527 A1* | 10/2014 | Won | G06F 3/04897 715/746 |
| 2014/0366041 A1 | 12/2014 | Stanley-Marbell et al. | |
| 2015/0046434 A1 | 2/2015 | Lim et al. | |
| 2015/0121229 A1* | 4/2015 | Wang | G06F 3/0484 715/728 |
| 2015/0172955 A1 | 6/2015 | Meekel et al. | |
| 2016/0019092 A1* | 1/2016 | Yuan | G06F 9/44594 718/107 |
| 2016/0098681 A1* | 4/2016 | Canis | G06Q 40/12 705/301 |

FOREIGN PATENT DOCUMENTS

| | | |
|---|---|---|
| WO | WO 2012/112404 A2 | 8/2012 |
| WO | WO 2014/116879 A1 | 7/2014 |

OTHER PUBLICATIONS

European Search Report for European Patent Application No. 15836490.1 dated Jul. 13, 2017.

* cited by examiner

300

METHOD AND APPARATUS FOR MANAGING BACKGROUND APPLICATION

CROSS-REFERENCE TO RELATED APPLICATION

This application is based upon and claims priority to Chinese Patent Application No. 201410426114.2, filed on Aug. 26, 2014, the entire content of which is incorporated herein by reference.

TECHNICAL FIELD

The present disclosure generally relates to the field of computer technologies and, more particularly, to an operating method and apparatus for managing a background application.

BACKGROUND

Mobile devices nowadays generally support multiple applications running concurrently in a multitasking environment. Some executing applications, referred to as foreground applications, run at the foreground and may be displayed and operated by a user. Other executing applications run in the background, may not be visible to the user, and typically do not interfere with user operations on the foreground applications. These are referred to as background applications.

Background applications occupy a certain amount of resources of a mobile device, such as memory, power, or network resources, and may affect operating efficiency of the mobile device. In conventional technologies, a user may move an unnecessary background application to the foreground and then operate to close the application. A user may also enter into the task manager interface to close unnecessary background applications. Since background applications are not visible in a foreground interface of a mobile device, a user may often neglect to close unnecessary background applications, resulting in waste of mobile device resources and reduced operating efficiency.

SUMMARY

The present disclosure provides a method for managing a background application. Consistent with some embodiments, the method includes determining whether an operating feature of the background application satisfies a preset condition, and when it is determined that the operating feature of the background application satisfies the preset condition, displaying an operating interface in a foreground interface of a mobile device for a user to close the background application.

Consistent with some embodiments, this disclosure provides an apparatus for managing a background application. The apparatus includes a determining unit configured to determine whether an operating feature of the background application satisfies a preset condition, and a notification unit configured to, when it is determined that the operating feature of the background application satisfies the preset condition, display an operating interface in a foreground interface of a mobile device for a user to close the background application.

Additional objects and advantages of the disclosed embodiments will be preset forth in part in the following description, and in part will be apparent from the description, or may be learned by practice of the embodiments. The objects and advantages of the disclosed embodiments may be realized and attained by the elements and combinations preset forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations preset forth in the following description of exemplary embodiments do not represent all implementations consistent with the invention. Instead, they are merely examples of apparatuses and methods consistent with aspects related to the invention as recited in the appended claims.

Figure 1A:
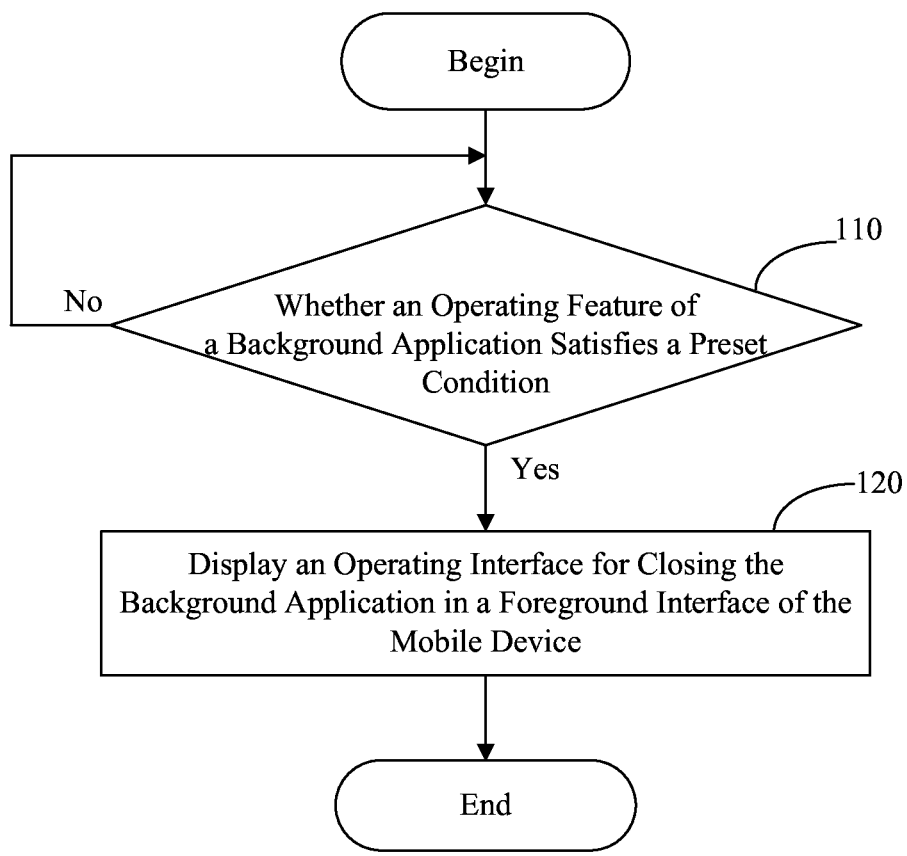
FIG. 1a is a flowchart of an exemplary method for managing a background application, consistent with some embodiments of this disclosure.

FIG. 1a is a flowchart of an exemplary method 100a for managing a background application, consistent with some embodiments of this disclosure. The method 100a may be performed by a mobile device, such as a smart phone, a tablet device, etc. Referring to FIG. 1a, the method 100a includes the following steps.

In step 110, the mobile device determines whether an operating feature of a background application satisfies a preset condition for closing the background application. If the preset condition is satisfied, the mobile device proceeds to step 120. Otherwise, the mobile device may wait for a predetermined time interval before repeating step 110. Alternatively, the mobile device may terminate the flow if the preset condition is not satisfied.

In step 120, the mobile device displays an operating interface for closing the background application in the foreground interface of the mobile device. In some embodiments, the mobile device may determine that there are multiple background applications satisfying the preset condition, and may display an operating interface that allows a user to close multiple background applications through the operating interface.

Figure 1B:
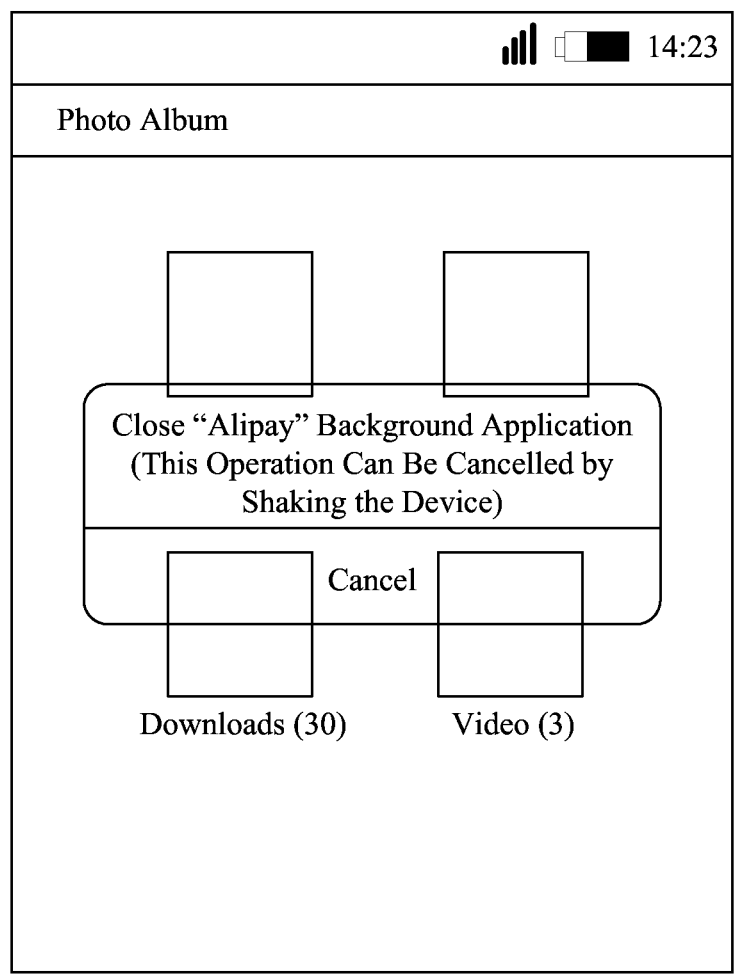
FIGS. 1b-1e illustrate exemplary operating interfaces for closing a background application, consistent with some embodiments of this disclosure.

The operating interface may include an option that can be selected by a user to close the background application. For example, the operating interface may be a pop-up window, and may include a button, an icon, or the like displayed in the window for a user to select to close the background application. FIG. 1*b* illustrates an exemplary operating interface 100*b* for closing a background application, consistent with some embodiments of this disclosure. As shown in FIG. 1*b*, the operating interface may be a window that pops up on the foreground application interface. The window may include a selectable element for a user to close a background application, such as a closing button, which is shown in FIG. 1*b* as a highlighted region containing "Close Alipay Background Application". The operating interface may also include a selectable element to maintain the background application, such as a canceling button, which is shown in FIG. 1*b* as a highlighted region containing "Cancel". When a user selects the option in the pop-up window to close a background application, such as the closing button, the corresponding background application may be closed. As shown in FIG. 1*b*, the pop-up window provides a relatively prominent prompt for the user to close the background application.

Figure 1C:
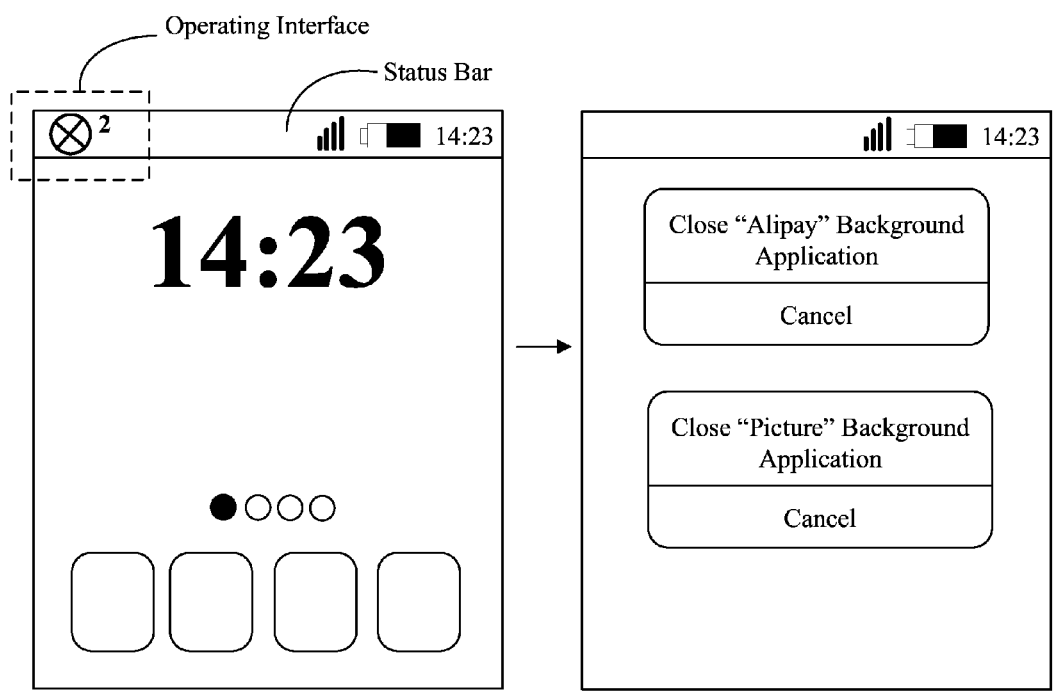

FIG. 1*c* illustrates another exemplary operating interface for closing a background application, consistent with some embodiments of this disclosure. As shown in the left diagram of FIG. 1*c*, the operating interface may be a prompt icon in a status bar displayed at the top of a mobile device display. When the user selects the prompt icon, a window similar to that of FIG. 1*b* may be displayed. The prompt icon does not interfere with the user operations on the foreground application, and allows the user to close the background application at a desired time.

As shown in the right diagram of FIG. 1*c*, when the user selects the prompt icon, two pop-up windows, corresponding to background applications "Alipay" and "Picture" respectively, are displayed in the foreground application interface of the mobile device. When the user selects the closing button contained in the window, the corresponding background application may be closed. For example, when the use clicks "Close Alipay Background Application", the background application of "Alipay" may be closed.

Figure 1D:
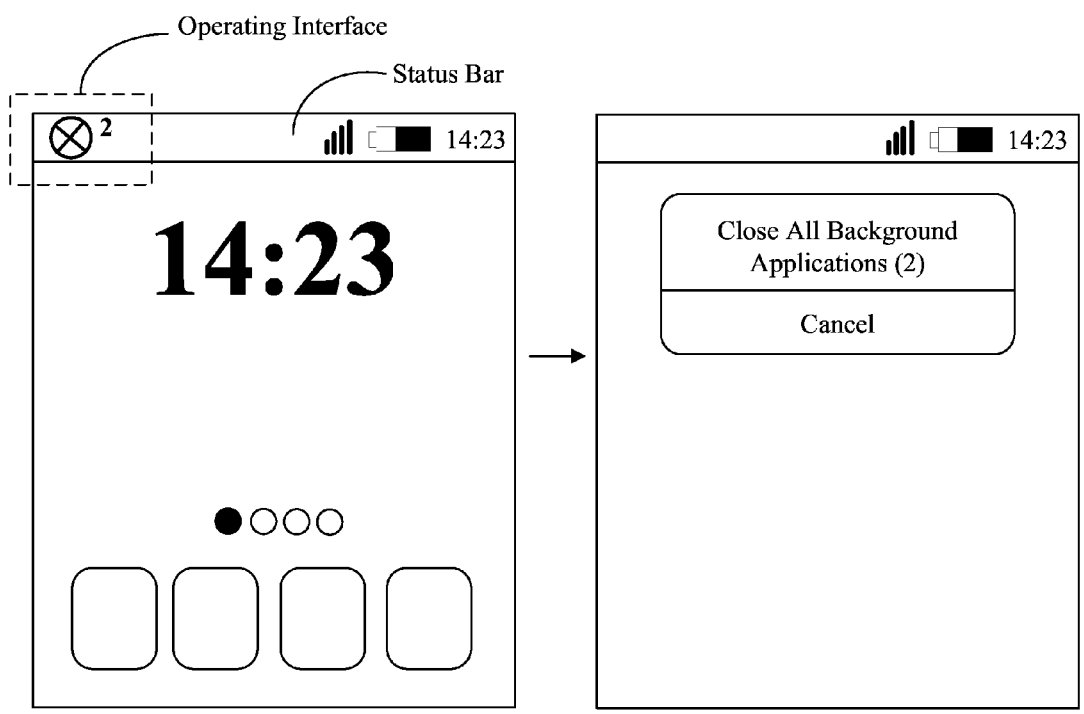

In some embodiments, the operating interface displayed in the foreground interface of the mobile device may include an option for closing all background applications that satisfy the preset condition. FIG. 1*d* illustrates another exemplary operating interface for closing a background application, consistent with some embodiments of this disclosure. The left diagram of FIG. 1*d* is the same as the left diagram of FIG. 1*c*, while the right diagram of FIG. 1*d* includes a pop-up window that allows the user to close all background applications. In this example, there are two background applications satisfying the preset condition, and the operating interface allows the user to close the two background applications in a single action. As shown in FIG. 1*d*, when the user clicks the close-all button in the window, which is shown in FIG. 1*d* as a highlighted region containing "Close All Background Applications (2)", both background applications may be closed.

In some embodiments, the user's intention to close all background applications may be identified based on the user's operations. When the mobile device determines that the user intends to close all background applications that satisfy the preset condition, an operating interface that includes an option for closing all background applications may be displayed on the foreground interface of the mobile device. In doing so, the user can close all background applications that satisfy the preset condition at once by selecting the option. As the background applications that can be closed through the operating interface each satisfies the preset condition, the chance of a user inadvertently closing a required background application is reduced, and the operation accuracy by the user is improved.

For example, when the mobile device detects that three background applications are closed by the user at a substantially same time and that there is at least one unclosed background application currently running, an operating interface for closing all background applications that satisfy the preset condition may be displayed in the foreground interface of the mobile device. As another example, when the mobile device detects that three background applications are closed by the user within 3 seconds and that there is at least one unclosed background application currently running, an operating interface for closing all background applications that satisfy the preset condition may be displayed in the foreground interface of the mobile device. As another example, when the mobile device detects that three background applications are closed by the user successively, the time interval between two successive closing operations is less than 1 second, and there is at least one unclosed background application currently running, an operating interface for closing all background applications that satisfy the preset condition may be displayed in the foreground interface of the mobile device.

Figure 1E:
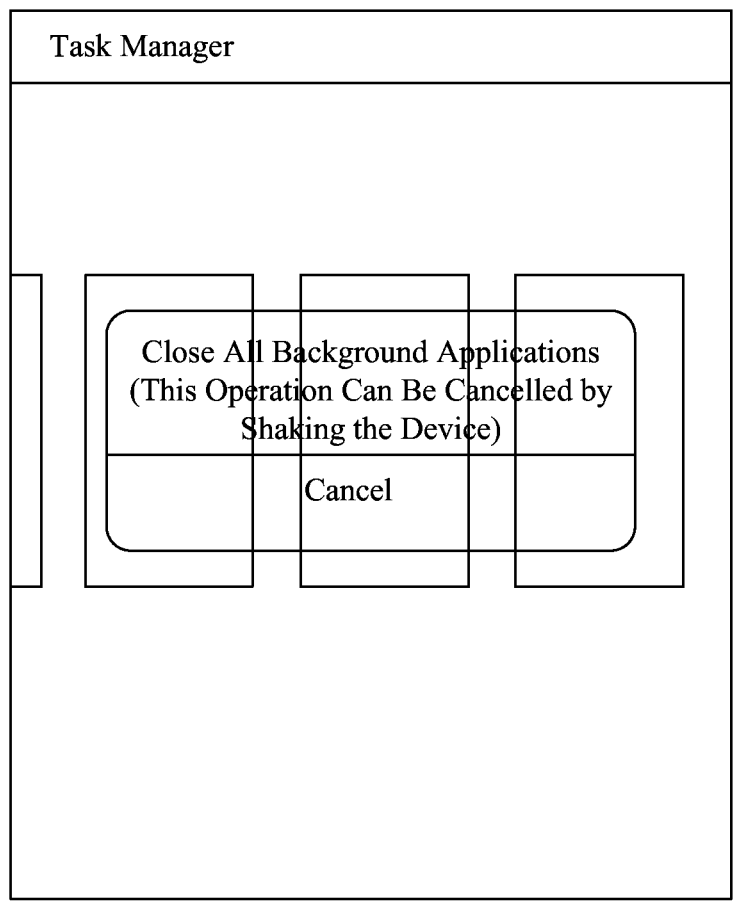

FIG. 1*e* illustrates another exemplary operating interface for closing a background application, consistent with some embodiments of this disclosure. As shown in FIG. 1*e*, when the current foreground interface of a mobile device is a task manager interface, an operating interface for closing all background applications may be displayed in a pop-up window in the task manager interface, allowing a user to close all background applications at once. When the current foreground interface of a mobile device is an application interface, the operating interface may be displayed in a pop-up window in the foreground application interface, which includes an option for closing all background applications. Alternatively, as shown in FIG. 1*d*, a prompt icon may be displayed in a status bar for closing all background applications that satisfy the preset condition.

In some embodiments, the preset condition for displaying the operating interface to close the background application may include that a preset number of background applications have been closed by the user, where the preset number of background applications satisfies a preset operation condition, and there is at least one unclosed background application running in the mobile device. For example, the preset operation condition may be that the preset number of background applications are closed by the user at substantially the same time. As another example, the preset operation condition may be that the preset number of background applications are closed by the user within a permitted duration. As another example, the preset operation condition may be that the preset number of background applications are closed by the user successively, and the time interval between two successive closing operations is less than a permitted time interval.

In some embodiments, the preset condition for displaying the operating interface may be that an idle period of the background application is greater than a preset duration threshold value. The idle period of the background application may include a duration in which no user operation or data update associated with the background application is performed. For example, when the mobile device detects that the duration in which no operation of the background application is performed exceeds a preset duration threshold value, such as 1 hour, an operating interface for closing the background application may be displayed in the foreground interface of the mobile device. Since the user has not used the background application for a long period, it is likely that the user neglected to close the background application, or the user did not close the background application properly. The operating interface may prompt the user to close the background application, thereby reducing the waste of resources of the mobile device.

As another example, a background application is configured to download data from Internet, and when the mobile device detects that the duration in which the background application does not update any data exceeds a preset duration threshold value, such as 10 minutes, an operating interface for closing the background application may be displayed in the foreground interface of the mobile device. Since the background application has not updated any data for a long period, it is likely that the network is interrupted or the downloading has been completed. As such, the operating interface may prompt the user to promptly close the background application, thereby reducing the waste of resources of the mobile device.

In some embodiments, the preset condition for displaying the operating interface to close the background application may be that the background application is running in a preset time period. For example, a user may configure the mobile device to close all background applications during the sleep period from 11 PM to 7 AM of the next day, so as to save the power of the mobile device. When the mobile device detects that the background application is running in the preset time period, an operating interface for closing the background application may be displayed in the foreground interface of the mobile device.

In some embodiments, the preset condition for displaying the operating interface to close the background application may be that the operating environment of the background application does not match a preset environmental parameter requirement. For example, a 3G network environment may be required for a background application to run smoothly. When the mobile device detects that the current network environment is not a 3G network environment, an operating interface for closing the background application may be displayed in the foreground interface of the mobile device. As another example, it may be required that the environmental noise be not higher than 45 dB for a background application to properly play audio. When the mobile device detects that the environmental noise is higher than 45 dB, an operating interface for closing the background application may be displayed in the foreground interface of the mobile device. In doing so, the user may promptly close a background application that cannot be used properly, thereby reducing the waste of resources of the mobile device.

In some embodiments, the preset condition for displaying the operating interface to close the background application may be that the use frequency of the background application is lower than a preset frequency threshold value. For example, when the mobile device detects that the use frequency of a background application is lower than a preset frequency threshold value, an operating interface for closing the background application may be displayed in the foreground interface of the mobile device. It is likely that the background application with a low use frequency is inadvertently opened by the user. The operating interface may be displayed in the foreground interface of the mobile device such that the user may promptly close the application, thereby reducing the waste of resources of the mobile device.

In some embodiments, the mobile device may receive a request for canceling a previously performed closing operation and reopen the previously closed background application. For example, the request for canceling the closing operation may be triggered by a shaking operation of the mobile device. After a shaking operation, the last closed background application may be reopened and running the mobile device. The shaking operation herein refers to the action that a user shakes a mobile device. As shown in FIGS. 1b and 1e, a prompt for canceling a previous closing operation, such as "this operation can be cancelled by shaking", may be provided in the operating interface. The prompt for canceling a previous closing operation is not limited to the form of text, and may be in in other forms such as icon. For example, if the user inadvertently closes all background applications through the option for closing all background applications, these closed background applications may be reopened by shaking the mobile device. The request for canceling the previously performed closing operation may also be triggered by other user actions, such as pressing a volume key, rotating the screen of the mobile device, clicking a cancel button on the mobile device, etc.

In the method 100a, by displaying an operating interface, a user may promptly close unnecessary background applications through the operating interface, thereby reducing the waste of resources of the mobile device and improving its operating efficiency. Further, user operation is simplified when the mobile device provides an operating interface for the user to close the background application which satisfies the preset condition.

This disclosure does not limit the specific programming languages used to implement the above described embodiments. For example, in an Android system, Java may be used for programming, and in an IOS system, object-c or swift may be used for programming.

In some implementations, a single mobile device may perform all steps of the method 100. For example, step 110 and step 120 may be executed by a first device. In other implementations, the steps of the method 100 may be separately performed by different devices. For example, step 110 may be executed by a first device, and step 120 may be executed by a second device.

Figure 2:
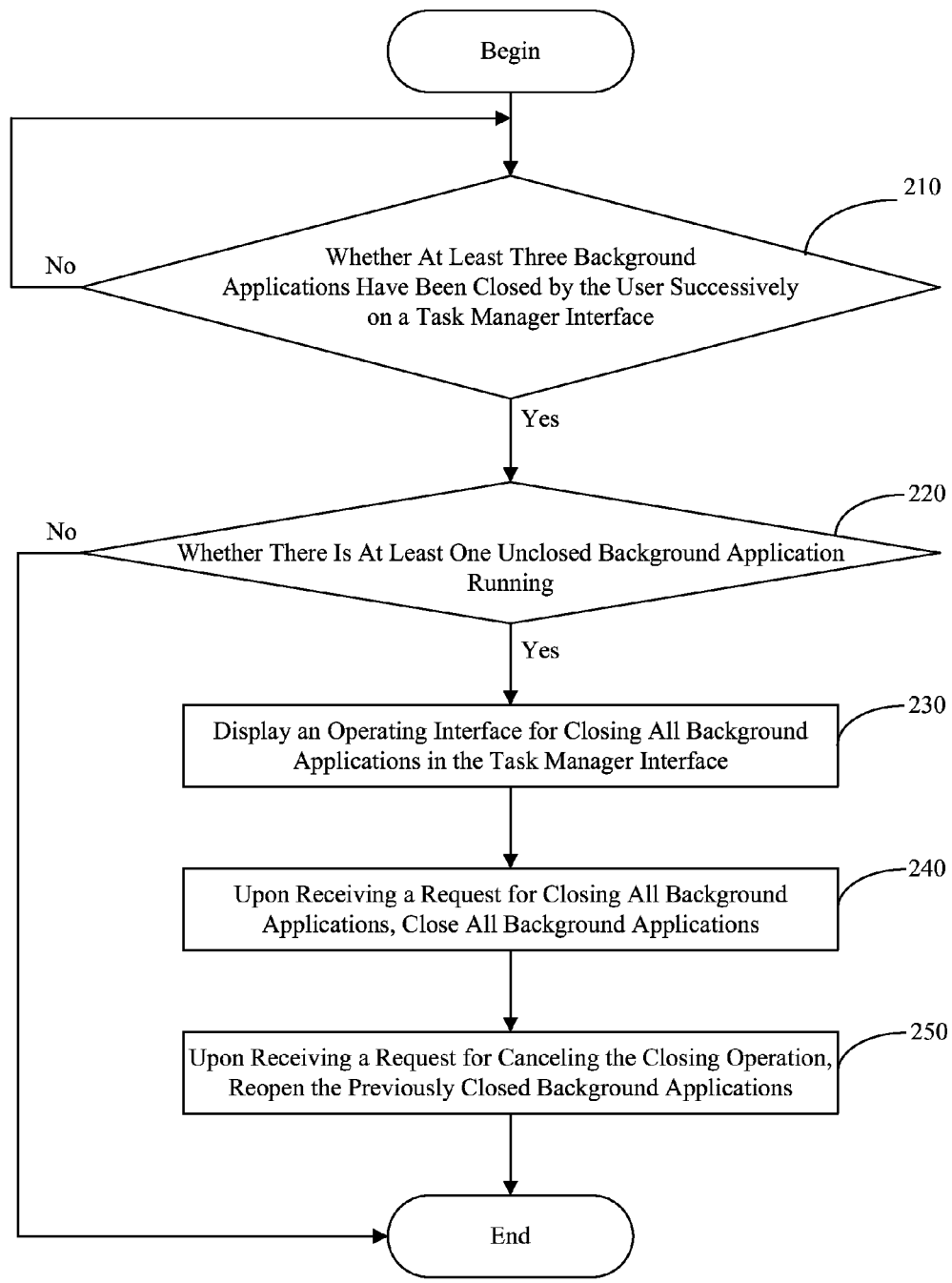
FIG. 2 is a flowchart of another exemplary method for managing a background application, consistent with some embodiments of this disclosure.

FIG. 2 is a flowchart of another exemplary method 200 for managing a background application, consistent with some embodiments of this disclosure. The method 200 may be performed by a mobile device, such as a smart phone, a tablet device, etc. In this example, the current foreground interface of the mobile device is a task manager interface. Referring to FIG. 2, the method 200 includes the following steps.

In step 210, the mobile device determines whether at least three background applications have been closed by the user successively on a task manager interface, where the time interval between two successive closing operations is less than a predetermined time interval, such as 1 second. If at least three background applications have been closed by the user successively on the task manager interface, and the time interval between two successive closing operations is less than the predetermined time interval, the mobile device proceeds to step 220. Otherwise, the mobile device waits for a preset time duration before repeating step 210.

In step 220, the mobile device determines whether there is at least one unclosed background application running. If there is at least one unclosed background application running, the mobile device proceeds to step 230. Otherwise, the mobile device may end the flow.

In step 230, the mobile device displays an operating interface for closing all background applications in the task manager interface. The operating interface may include an option for a user to close all background applications, such as a closing button, an icon, etc.

In step 240, upon receiving a request for closing all background applications, the mobile device closes all background applications. For example, when a user selects the option displayed in the operating interface for closing all background applications, the mobile device may determine that a request for closing all background applications is received and correspondingly close all background applications. In some implementations, when all background applications have been closed, the home interface may be displayed as the foreground interface of the mobile device.

In step 250, upon receiving a request for canceling the closing operation, the mobile device reopens the background applications that were previously closed in step 240.

By displaying an operating interface for closing all background applications in the task manager interface when certain conditions are satisfied, the method 200 allows the user to promptly close all unnecessary background applications, thereby reducing the waste of resources of the mobile device and improving the efficiency and accuracy of the user operations.

Figure 3:
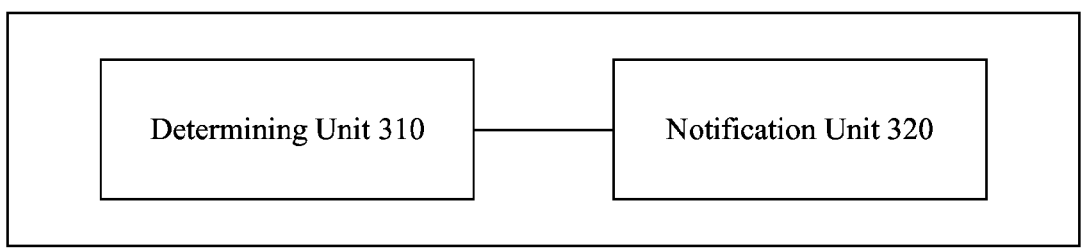
FIG. 3 is a block diagram of an exemplary apparatus for managing a background application, consistent with some embodiments of this disclosure.

FIG. 3 is a block diagram of an exemplary apparatus 300 for managing a background application, consistent with some embodiments of this disclosure. Referring to FIG. 3, the apparatus 300 includes a determining unit 310 and a notification unit 320.

The determining unit 310 is configured to determine whether an operating feature of a background application satisfies a preset condition. In some embodiments, the preset condition may be that a preset number of background applications have been closed by a user, the preset number of background applications satisfies a preset operation condition, and there is at least one unclosed background application currently running. For example, the preset operation condition may be that the preset number of background applications are closed by the user at a substantially same time. As another example, the preset operation condition may be that the preset number of background applications are closed by the user within a permitted time duration. As another example, the preset operation condition may be that the preset number of background applications are closed by the user successively, and the time interval between two successive closing operations is less than a permitted time interval.

In some embodiments, the preset condition may be that an idle period of the background application is greater than a preset duration threshold value. The idle period of the background application may include a duration in which no user operation or data update associated with the background application is performed.

Alternatively or in addition, the preset condition may be that the background application is running within a preset time period. The preset condition may also be that the operating environment of the background application does not match a preset environmental parameter requirement. The preset condition may also be that the use frequency of the background application is lower than a preset frequency threshold value.

The notification unit 320 is configured to, when it is determined that the operating feature of the background application satisfies the preset condition, display an operating interface for closing the background application in a foreground interface of the mobile device.

In some embodiments, the determining unit 310 may be configured to determine that there are multiple background applications satisfying the preset condition, and the notification unit 320 may be configured to display an operating interface for closing all background applications that satisfy the preset condition in the foreground interface of the mobile device.

In some embodiments, the apparatus 300 may identify the user's intention to close all background applications based on the user's operations. When it is determined that the user intends to close all background applications, the notification unit 320 may display an operating interface for closing all background applications that satisfy the preset condition in the foreground interface of the mobile device, such that the user can close all background applications at once by selecting an option provided in the operating interface. In some implementations, the notification unit 320 may display the operating interface for closing all background applications in the foreground interface when the user's operations satisfy certain conditions and there is at least one unclosed background application running in the background.

In some embodiments, the apparatus 300 may further include a receiving unit configured to receive a request for canceling the closing operation, and an operation canceling unit configured to reopen the background application that was previously closed by the user. In some implementations, the request for canceling the closing operation may be triggered by a shaking operation of the mobile device.

In exemplary embodiments, a non-transitory computer-readable storage medium including instructions is also provided, and the instructions may be executed by a device (such as a terminal device, a server, a personal computer, or the like), for performing the above-described methods. The device may include one or more processors (CPUs), an input/output interface, a network interface, and/or a memory.

For example, the non-transitory computer-readable storage medium may be read-only memory (ROM), random access memory (RAM), Compact Disc Read-Only Memory (CD-ROM), magnetic tape, floppy disk, and optical data storage device, etc. Examples of RAM include Phase Change Random Access Memory (PRAM), Static Random Access Memory (SRAM), Dynamic Random Access Memory (DRAM), and other types of RAM.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. Further, the singular forms "a," "an," and "the" used herein and in the appended claims include plural references unless the context clearly dictates otherwise.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for managing a background application, comprising:
    determining whether an operating feature of the background application satisfies a preset condition, wherein the preset condition comprises:
        at least a preset number of background applications are closed by the user, and there is at least one background application running in the mobile device, wherein the preset number of background applications satisfy a preset operation condition; and
    when it is determined that the operating feature of the background application satisfies the preset condition, displaying an operating interface in a foreground interface of a mobile device for a user to close the background application.

2. The method according to claim 1, wherein the preset operation condition comprises at least one of the following:
    the preset number of background applications are closed at a substantially same time;
    the preset number of background applications are closed within a permitted duration; and
    the preset number of background applications are closed successively, and a time interval between two successive closing operations is less than a permitted time interval.

3. The method according to claim 1, further comprising: determining each of a plurality of background applications satisfies the preset condition, wherein the operating interface includes an option for the user to close the plurality of background applications.

4. The method according to claim 1, further comprising: receiving a request for canceling a previous closing operation associated with the background application; and reopening the background application in the mobile device.

5. The method according to claim 4, wherein the request is triggered by a shaking operation of the mobile device.

6. The method according to claim 1, wherein the operating interface includes a selectable element for the user to close the background application.

7. The method according to claim 1, wherein the operating interface includes a prompt icon contained in a status bar of the foreground interface, and upon a selection of the prompt icon, a window is displayed in the foreground interface, wherein the window includes a selectable element for the user to close the application.

8. An apparatus for managing a background application, comprising:
    a determining unit configured to determine whether an operating feature of the background application satisfies a preset condition, wherein the determining unit is configured to:
        determine whether at least a preset number of background applications are closed by the user and whether there is at least one background application running in the mobile device, wherein the preset number of background applications satisfy a preset operation condition; and
    a notification unit configured to, when it is determined that the operating feature of the background application satisfies the preset condition, display an operating interface in a foreground interface of a mobile device for a user to close the background application.

9. The apparatus according to claim 8, wherein the preset operation condition comprises at least one of the following:
    the preset number of background applications are closed at a substantially same time;
    the preset number of background applications are closed within a permitted duration; and
    the preset number of background applications are closed successively, and a time interval between two successive closing operations is less than a permitted time interval.

10. The apparatus according to claim 8, wherein the determining unit is further configured to determine that each of a plurality of background applications satisfies the preset condition, and wherein the operating interface includes an option for the user to close the plurality of background applications.

11. The apparatus according to claim 8, further comprising: a receiving unit configured to receive a request for canceling a previous closing operation associated with the background application; and an operation canceling unit configured to reopen the background application in the mobile device.

12. The apparatus according to claim 11, wherein the request is triggered by a shaking operation of the mobile device.

13. The apparatus according to claim 8, wherein the operating interface includes a selectable element for the user to close the background application.

14. The apparatus according to claim 8, wherein the operating interface includes a prompt icon contained in a status bar of the foreground interface, and upon a selection of the prompt icon, a window is displayed in the foreground interface, wherein the window includes a selectable element for the user to close the application.

* * * * *